United States Patent [19]

Fidziukiewicz

[11] Patent Number: 5,390,903
[45] Date of Patent: Feb. 21, 1995

[54] VARIABLE FORCE DIE SPRING ASSEMBLY

[75] Inventor: Erich D. Fidziukiewicz, Canton, Mich.

[73] Assignee: Connell Limited Partnership, Boston, Mass.

[21] Appl. No.: 117,399

[22] Filed: Sep. 3, 1993

[51] Int. Cl.6 ............................................. B60G 11/34
[52] U.S. Cl. ..................... 267/28; 267/162; 267/169; 267/170; 267/259
[58] Field of Search ............... 267/289, 290, 291, 168, 267/169, 170, 174, 23, 28, 33, 162, 70, 259

[56] References Cited

U.S. PATENT DOCUMENTS

| | | |
|---|---|---|
| 48,084 | 6/1865 | Murray . |
| 94,100 | 8/1869 | Gardiner .................... 267/33 |
| 195,330 | 9/1877 | Barr ........................... 267/33 |
| 212,688 | 2/1879 | Hansell . |
| 456,592 | 7/1891 | Peckham .................... 267/33 |
| 932,489 | 8/1909 | Murrey . |
| 1,825,093 | 9/1931 | Sansburn . |
| 2,511,254 | 11/1945 | Fulton ........................ 267/290 |
| 2,647,412 | 8/1953 | Warmoes et al. . |
| 2,660,423 | 11/1953 | Roy ............................ 267/33 |
| 2,688,884 | 8/1954 | Warmoes et al. . |
| 3,253,718 | 5/1966 | Anderson et al. ......... 267/33 X |
| 3,507,486 | 4/1970 | Schwaller . |
| 3,556,504 | 1/1971 | Sinclair . |
| 3,559,976 | 2/1971 | Jerz, Jr. . |
| 3,862,751 | 1/1975 | Schwaller . |
| 4,033,542 | 7/1977 | Moehle et al. . |

FOREIGN PATENT DOCUMENTS

| | | |
|---|---|---|
| 632286 | 1/1962 | Italy . |
| 55-163348 | 12/1980 | Japan . |
| 1141719 | 1/1969 | United Kingdom ............... 267/162 |
| 300357 | 12/1971 | U.S.S.R. . |
| 368082 | 1/1973 | U.S.S.R. . |
| 1305468A | 4/1987 | U.S.S.R. . |
| 1551565A | 3/1990 | U.S.S.R. . |

Primary Examiner—Robert J. Oberleitner
Assistant Examiner—Lee W. Young
Attorney, Agent, or Firm—Leydig, Voit & Mayer, Ltd.

[57] ABSTRACT

A variable force die spring is disclosed which combines high force, short axial compression distance spring assembly, such as belleville springs, and low force, high axial compression distance springs, such as coil springs, in a telescoping casing having an internal cavity. The springs are arranged within the cavity so that upon receiving a load the low force spring will compress first resulting in a large axial compression and low force resistance. The load applied to the telescoping casing will then transition from the low force spring to the high force spring. The high force spring then compresses as the load continues to be applied. In alternative embodiments, a third intermediate spring is added that compresses moderate distances under moderate pressure thereby increasing the overall axial compression and load capacity capabilities of the spring assembly. In any embodiment, the invention results in a spring that provides high forces and low axial compression when it is nearly fully compressed and low forces and high axial compression at all other stages of compression.

21 Claims, 8 Drawing Sheets

VARIABLE FORCE DIE SPRING ASSEMBLY

FIELD OF THE INVENTION

This invention relates generally to power presses and more particularly to high force springs used in tooling operations.

BACKGROUND OF THE INVENTION

In the metalworking industry, power presses are often used to form stock material such as steel or sheet metal into a variety of components. For example, in the automotive industry, sheet stock is formed into components of relatively small parts, such as engine struts, as well as significantly larger vehicle body components, such as deck lids, doors, and quarter panels. In these operations, the work piece is typically drawn or struck one or more times between upper and lower die halves to form the stock into a desired shape. Due to the particular shape of the article, in many applications it is necessary to perform an operation on the work piece at an angle other than with the travel of the press. For example, it may be necessary to punch an opening into or trim flash from the edge of the work piece.

Cam units are often used in power presses to perform these auxiliary tooling operations such as punching, forming, re-striking, flanging and trimming. An example of such a cam unit can be seen in co-pending application Ser. No. 07/819,347 now U.S. Pat. No. 5,269,167. As shown in that application, the cam unit is equipped with a tool mounted on a slide block and is installed on either the lower die or the upper die of the power press. The cam is constructed such that as the power press cycles, the cam unit compresses in a manner that converts the vertical motion of the press into a lateral motion of the tool mounted on the cam. This lateral movement brings the tool into contact with the work piece and thereby provides the force required to perform the tooling operation.

Cam units used in tooling operations typically require springs that will provide both the force needed to move a slide block with an attached tool into home position and provide the force needed to perform the desired stripping/work holding operation. However, the force required to perform the stripping/work holding operation is usually much greater than the force required to move the slide block. Most conventional springs are limited in the amount of force they exert. Therefore, to attain the desired stripping/work holding forces, conventional springs would have to be used in such numbers and be preloaded to such a degree that they would prove ill suited for most cam designs. Moreover, the force build-up to the slide block while being placed in position to do work would then be unnecessarily excessive and thereby abuse the mechanism and waste press energy.

Traditionally, gas springs such as nitrogen springs have been the spring of choice for cam operations. The use of these gas springs in a cam unit is illustrated by reference numeral 128 in FIG. 3 of co-pending application Ser. No. 07/819,347 now U.S. Pat. No. 5,269,167. These springs supply the high forces needed to perform stripping/work holding operations but, as mentioned above, they supply these same high forces throughout the entire slide block movement. Gas springs require an elaborate support system of compression chambers, tubing and valves to control the amount of gas pressure in the gas springs. This support system wastes valuable space in production lines and requires maintenance and frequent monitoring by operating personnel. Furthermore, since the gas pressure is manually controlled the effectiveness of the gas springs is dependent upon the activities of the operating personnel. Consequently, human error in the monitoring of the gas springs can result in poorly tooled work products.

Thus, the prior art has failed to provide a low cost spring for cam operations that provides sufficient force for tooling operations without supplying excessive force to the slide block. Consequently, there is a long felt need for a compact, low cost, self-monitoring spring that supplies large forces with short axial compression distances during tooling operations and low forces and large axial compression distances during the rest of the cam operations.

OBJECTS OF THE INVENTION

It is a general object of the invention to provide an improved spring assembly. More specifically, it is an object of the invention to provide an improved spring assembly for use in cam operations whose compression cycle characteristics closely match the force requirements of the cam cycle. More specifically, it is an object of the invention to provide a spring assembly that provides high forces and low axial compression distances when nearly fully compressed and low forces and high axial compression distances in all other compression states.

It is an additional object of the invention to provide an improved spring assembly for cam operations that is highly compact and requires minimal space in the cam unit. It is a related object of the invention to provide a spring assembly that is self-contained and does not require attachment to gas lines or the like. It is a further object of the invention to eliminate the need for charging the spring assembly used in the cam operation, and, therefore, minimize the need for ongoing operation personnel involvement. It is another related object of the invention to provide a safe spring assembly capable of enduring very high compression forces and whose self-contained construction protects operation personnel from injury in the event of spring failure.

Another object of the invention is to provide a spring assembly that is inexpensive to manufacture and maintain, and easy to install. Yet another object is to provide a spring assembly that may be preloaded to maximize spring longevity.

SUMMARY OF THE INVENTION

The present invention accomplishes these objectives and overcomes the drawbacks of the prior art springs by providing a variable force die spring assembly that combines high force, low axial compression distance springs with low force, high axial compression distance springs in a unique geometry. This results in a compact, low-cost spring assembly that supplies high forces and low axial compressions when nearly fully compressed and low forces and high axial compressions in all other states of compression. Consequently, this invention is an ideal spring assembly for use in cam operations. It supplies high forces during the actual tooling operation and low force during the rest of the cam operation.

More specifically, the invention provides a variable force die spring assembly comprising a casing having at least two slidably coupled telescoping components adapted to move between an extended position and a compressed position, and means for restricting the extended position of the casing. The casing further includes a central cavity having a first spring and a second spring. The first spring has a relatively low spring rate, such that it compresses large distances when subjected to low forces. Conversely, the second spring has a relatively high spring rate, such that it compresses short distances when subjected to heavy loads. The springs are configured within the casing such that the casing components slide relative to one another to compress the first spring and then the second spring as the force increases as external force is applied to the casing components.

The present invention preferably uses Belleville springs as its high force, low axial compression springs and coil springs as its low force, high axial compression springs. Both of these types of springs are compact and relatively inexpensive.

By taking advantage of the characteristics of the springs themselves, the present invention offers an attractive alternative to using gas springs in cam operations. Unlike gas springs the present invention does not require a support system for regulating spring force. As a result, it does not require the extensive monitoring costs and maintenance expenses necessitated by gas springs. Moreover, it obviates the need for any personnel involvement with the spring assembly once installed. Thus, the present invention provides a more compact, less expensive alternative to the gas spring.

In accordance with another aspect of this invention, the spring assembly structure comprises a steel casing having various telescoping stages that allow compression of the internally contained springs. The steel casing provides a safer and more efficient assembly than conventional springs. In the unlikely event of spring failure, the damaged spring parts will be contained in the steel casing. Consequently, the parts will not violently project and damage the surrounding tools or injure machine operating personnel.

Further, the variable force die spring assembly is more efficient than conventional springs because it obviates the need for, and in fact prevents, adjustments to the spring cycle. In assembly, the springs are preferably preloaded within the casing to restrict their ranges of compression and expansion. This preloading prevents the springs from becoming either fully released or fully compressed. Consequently, the range of spring operation is strictly maintained within parameters that maximize the life of the springs.

These and other features and advantages of the invention will be more readily apparent upon reading the following description of the preferred embodiment of the invention and upon reference to the accompanying drawings wherein:

DESCRIPTION OF THE PREFERRED EMBODIMENTS

Figure 1:
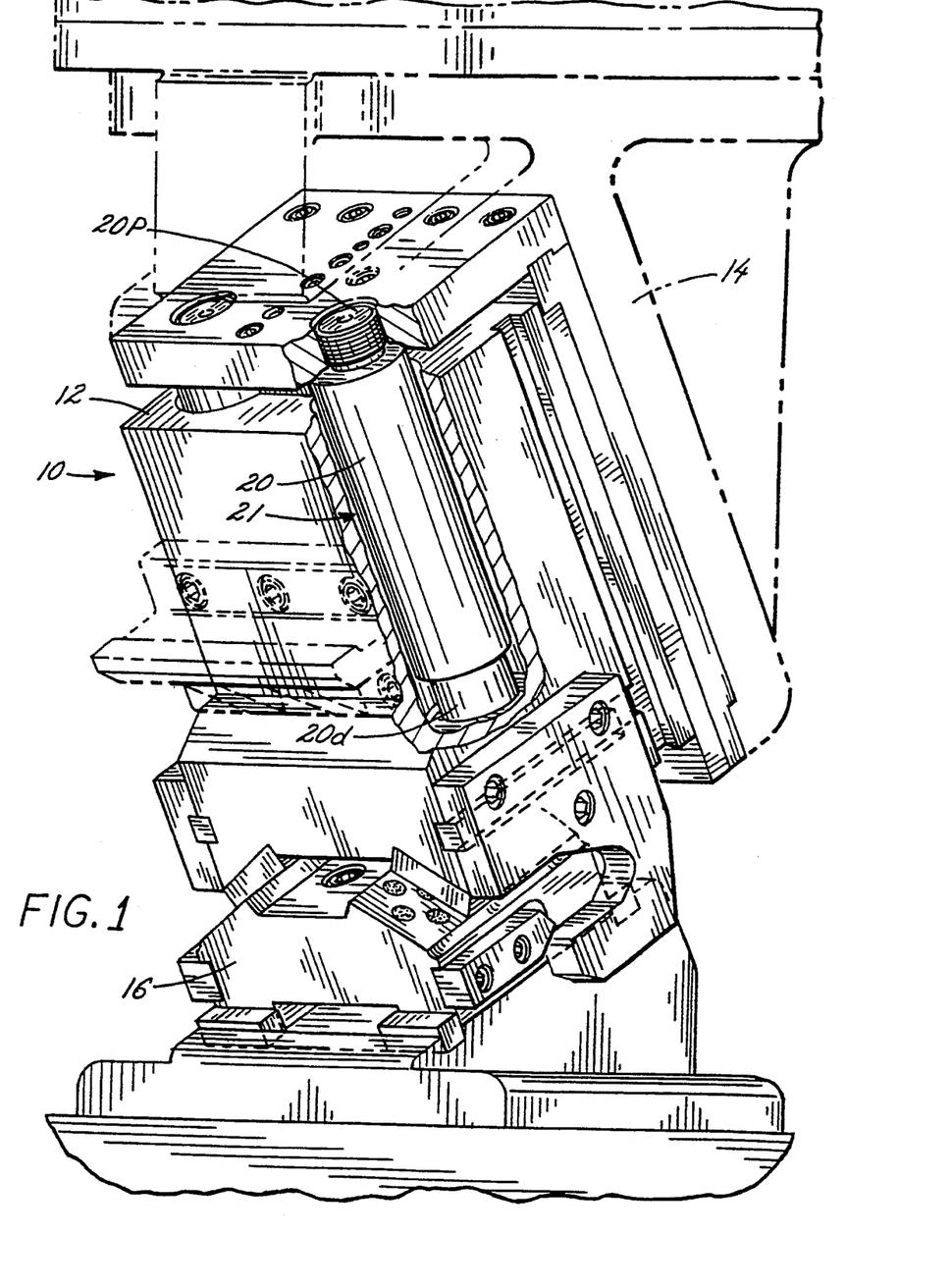
FIG. 1 is an elevational view of a cam unit employing a spring assembly constructed in accordance with teachings of the invention.

Turning now to the drawings and first to FIG. 1, there is shown an aerial cam unit 10, which is representative of the type used in performing various auxiliary tooling operations such as punching, forming, re-striking, flanging and trimming in a power press (not shown). It will be appreciated that the aerial cam unit 10 is shown only as an example of an environment in which the invention may be utilized. The invention, therefore, is not limited to use in this specific type of cam unit. Rather, the invention may be utilized in any apparatus which would benefit as a result of the performance characteristics of the invention. The cam unit 10 includes a slide block 12, which is slidably coupled to the ram of the press for movement therewith by a mounting bracket 14, and a driver 16, which is fixedly coupled to the press bed. In operation, as the ram progresses downward, the slide block 12 moves along the driver 16 to move the slide block 12 into position to perform a desired operation.

In order to control the movement of the slide block 12 during such operations, the cam unit 10 is provided with one or more spring assemblies 20. The cam unit 10 of FIG. 1 is partially broken away to reveal one of the spring assemblies 20 disposed within a bore 21. The spring assembly 20 is mounted such that the upper or proximal end 20p of each assembly moves with the mounting bracket 14 and the lower or distal end 20d moves with the slide block 12 in the particular environment illustrated. (For ease of understanding, the proximal and distal ends of the spring assembly and its components will be identified by the appropriate reference numeral followed by the letter "p" and the letter "d" respectively, i.e., xxxp and xxxd. Like nomenclature will be used in the explanation of the alternate embodiments of the invention.) In this way, the spring assemblies 20 are compressed to control the movement of the slide block 12 relative to the mounting bracket 14, and, additionally, a work piece (not shown) as the press cycles. The spring assembly 20 supplies sufficient force to perform the tooling operation at the end of the cam cycle without supplying excessive force in moving the slide block 12 of the cam unit 10 during the rest of the cycle.

In accordance with the invention, the performance of the spring assembly or assemblies 20 closely matches the force requirement of the cam cycle by exhibiting desirable performance characteristics over a distance. More specifically, each spring assembly 20 provides high forces and low axial compressions when nearly fully compressed and low forces and high axial compressions in all other states of compression. The spring assembly 20 comprises a casing having a central cavity and at least two slidably coupled telescoping components adapted to move between an extended position and a compressed position, and means for restricting the extended position. To provide the desired performance characteristics, the spring assembly 20 includes at least first and second springs disposed within the central cavity. The first spring exhibits a low spring rate, such that it compresses large distances when subjected to low forces, as when the slide block 12 first contacts the driver 16 and the ram continues to lower. The second spring exhibits a high spring rate, such that it compresses short distances when subjected to high forces, as in the final stages of compression when the slide block 12 moves upward relative to the mounting bracket 14 to move the tool into contact with the work piece.

Turning now to FIGS. 2A-D, there is shown a first embodiment of the invention. The spring assembly 20 comprises a casing 22 which consists of two or more telescoping components which are slidably coupled together for relative movement. In the embodiment shown in FIGS. 2A-2D, the casing 22 comprises only two telescoping components, an outer telescoping component 24 and an inner telescoping component 26 that fit slidably together such that the outer telescoping structure 24 slides over the inner telescoping structure 26. However, the casing 22 could include three or more telescoping components, as will be described with respect to alternative embodiments of the invention. While the casing 22 is generally formed of steel, alternative materials such as iron or iron alloys may likewise be appropriate. The telescoping components may be manufactured by turning, casting, or other appropriate fabrication methods.

Figure 2A:
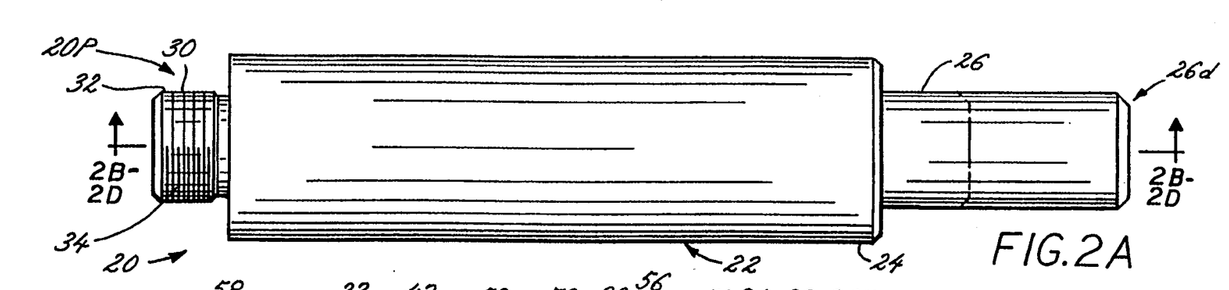
FIG. 2A is an elevational view of a spring assembly constructed in accordance with teachings of the invention wherein the spring assembly is shown in its free length state in solid lines and in its compressed positions in phantom lines.

As shown in FIG. 2A, the spring assembly 20 is in its free length state (shown in solid lines) when no external force is exerted on the assembly 20. When the spring assembly 20 is place under sufficient force, however, the spring assembly 20 is compressed to cause the telescoping components 24, 26 to slide or "telescope" relative to one another as the spring assembly 20 moves to the final compressed state shown in dotted lines in FIG. 2A.

In order to secure the spring assembly 20 to a cam unit 10 or the like, the spring assembly 20 includes a bottleneck portion 30 or the like at its proximal end 20p. The bottleneck portion 30 includes an annular surface 32 around which threads 34 are provided.

The spring assembly 20 can be temporarily fixed to the cam unit 10 by threading (and preferably securing with vibration resistant methods) the assembly 20 into the corresponding threading (not shown) on the cam unit 10. Preferably, the threaded portion 34 mates with corresponding threads in an opening in the mounting bracket 14, and the casing 22 is disposed within a bore 21 in the slide block 12 in a manner similar to that shown in FIG. 1. The opposite end is then contacted by a surface within the slide block 12 to move the telescoping components 24, 26 relative to one another when the spring assembly 20 is compressed. In this way, threads are not required at both ends in order for the spring assembly 20 to function properly.

It will be appreciated, however, that an alternative method or structure could likewise be used to couple the spring assembly 20 to the cam unit 10. For example, the spring assembly 20 could be provided with an extension that provides a flange for receiving a bolt. A bolt could then be passed through both the cam unit 10 and the extension thereby fixing the spring assembly 20 to the cam unit 10.

The telescoping feature of the spring assembly 20 may be more clearly described with reference to FIGS. 2B—D, which show cross-sectional views of the assembly 20 in various states of compression. As previously mentioned, the casing 22 of the spring assembly 20 has two components; an outer telescoping component 24 and an inner telescoping component 26. The inner telescoping component 26 is a cup-shaped structure having its opening 38 at its proximal end 26p. The closed head 40 at the distal end 26d of the component 26 provides a bearing surface at the distal end 20d of the assembly 20.

Similarly, the outer telescoping component 24 is a cup-shaped structure which comprises a tubular structure 42 into which the inner telescoping component 26 may slide. The inner telescoping component 26 is slidably fit into an aperture 44 formed at the distal end 24d of the outer telescoping component 24. In order to retain the components 24, 26 of the spring assembly 20 together as a self-contained unit, the spring assembly 20 is provided with means for restricting the extended position of the components 24, 26. In this embodiment, the components 24, 26 are provided with flanges 46, 48, which engage to limit the travel of the components 24, 26 relative to one another. In this embodiment, the flanges 46, 48 are continuous annular flanges, extending about the circumference of the telescoping components 24, 26. It will be appreciated, however, that the flanges 46, 48 could alternately be broken about the circumference of the components, 24, 26 so long as they engage to couple the telescoping components 24, 26 together. In this way, as will be further explained below, the components of the spring assembly 20 are coupled together to provide a self-contained unit which can easily be assembled into a cam unit 10 such as that shown in FIG. 1. While the coupling means in this embodiment comprises engaging flanges 46, 48, other coupling means, such as those provided in the alternate embodiments described below, will likewise be appropriate.

The outer telescoping component 24 further comprises a plug 50, which is disposed at the proximal end 24p of the component 24. In the illustrated embodiment, the plug 50 is disposed along the inner diameter of the tubular structure 42. In order to more readily position the plug 50 within the tubular structure 42, the tubular structure 42 includes a stepped inner diameter 17, 52, 54. The junction of the portion of the tubular structure 42 having a first inner diameter 17 and the portion having a second inner diameter 52 forms a first annular shoulder 18 therebetween. The junction of the portions of tubular structure 42 having the second inner diameter 52 and a third inner diameter 54 forms a flange or second annular shoulder 56 therebetween. Thus, during assembly, the plug 50 may be positioned within the tubular structure 42 such that it rests against the annular shoulder 18, and, preferably, is flush with the proximal end 24p of the tubular structure 42. After the plug 50 is properly positioned, it may be coupled to the tubular structure 42 by any appropriate means. In the embodiment shown, the plug 50 and the tubular structure 42 are fixedly attached by inserting stopping pegs 58 into corresponding openings in both components 24, 50. It will be appreciated, however, that other fixing means, such as welding, could likewise be used for this attachment. In the illustrated embodiment of the invention, the plug 50 includes the previously identified bottleneck portion 30 which includes threads 34 used to couple the spring assembly 20 to the cam unit 10 or the like. The bottleneck portion 30 extends beyond the proximal end 24p of the tubular structure 42.

The outer and inner telescoping components 24, 26 cooperate to form a central cavity 60 in the casing 22. The central cavity 60 is formed by the tubular structure 42 and plug 50 of the outer telescoping component 24, and the inner telescoping component 26. To provide means by which gas contained within the central cavity 60 may be released upon compression, the plug 50 is provide with a bore 62.

This central cavity 60 provides sufficient space to receive all of the internal springs of the invention. Thus, the casing 22 serves to wholly contain the internal springs of the invention and thereby provides a safe containment area in the event of spring failure. The casing walls will prevent any broken spring parts from ejecting and causing harm to the surrounding machinery and operating personnel.

In accordance with an important aspect of the invention, the spring assembly 20 provides low spring forces during the initial stages of compression and relatively high spring forces during the final stages of compression. In accomplishing this objective, the spring assembly 20 includes a low force spring 70 and a high force spring 72. The springs 70, 72 are disposed within the central cavity 60 such that when the assembly 20 is exposed to an axial compression force (represented by 74) the low force spring 70 compresses as the telescoping components 24, 26 move from the free length position shown in FIG. 2B to the intermediate position shown in FIG. 2C to present a relatively low resistance to compression. Although the low force spring 70 continues to compress as the telescoping components 24, 26 move from the position shown in FIG. 2C to the position shown in FIG. 2D, the force required to compress the spring assembly 20 during this stage of movement is substantially controlled by the high force spring 72.

Figure 2B:
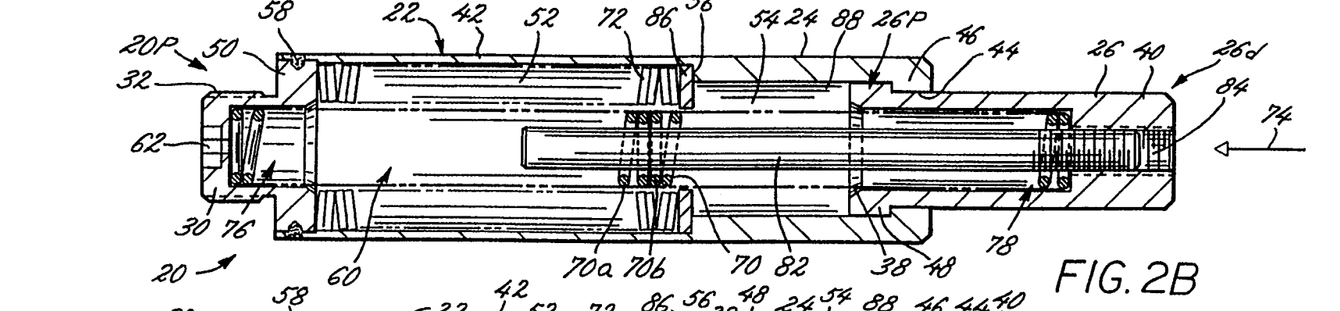
FIG. 2B is a cross-sectional view of the spring assembly in its free length state taken along line 2B—2B of FIG. 2A.
Figure 2C:
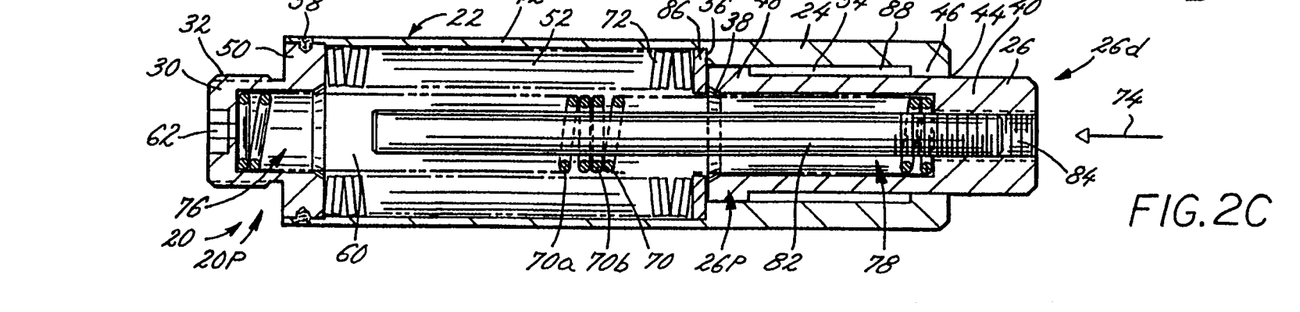
FIG. 2C is a cross-sectional view similar to FIG. 2B, but illustrating the spring assembly in an intermediate state of compression.
Figure 2D:
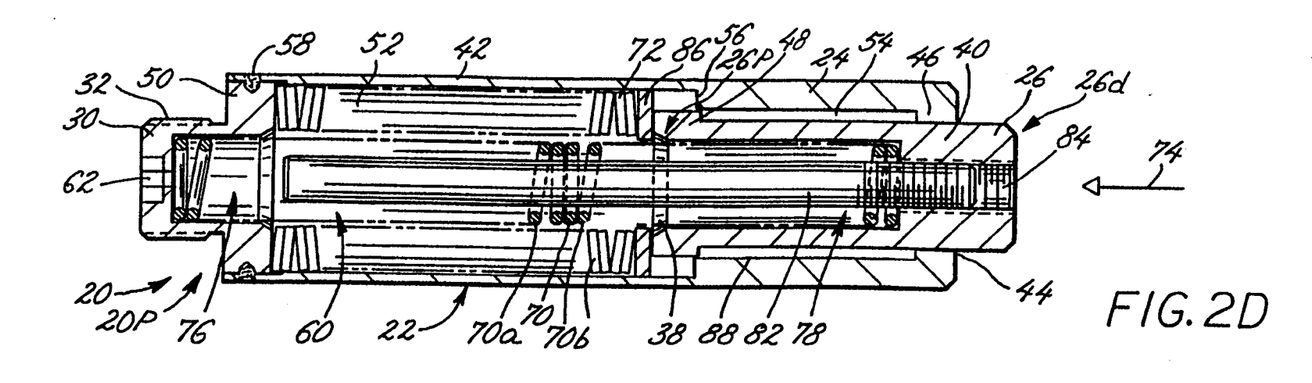
FIG. 2D is a cross-sectional view taken along line 2D—2D in FIG. 2A, and illustrates the spring assembly in its fully compressed state.
Figure 3:
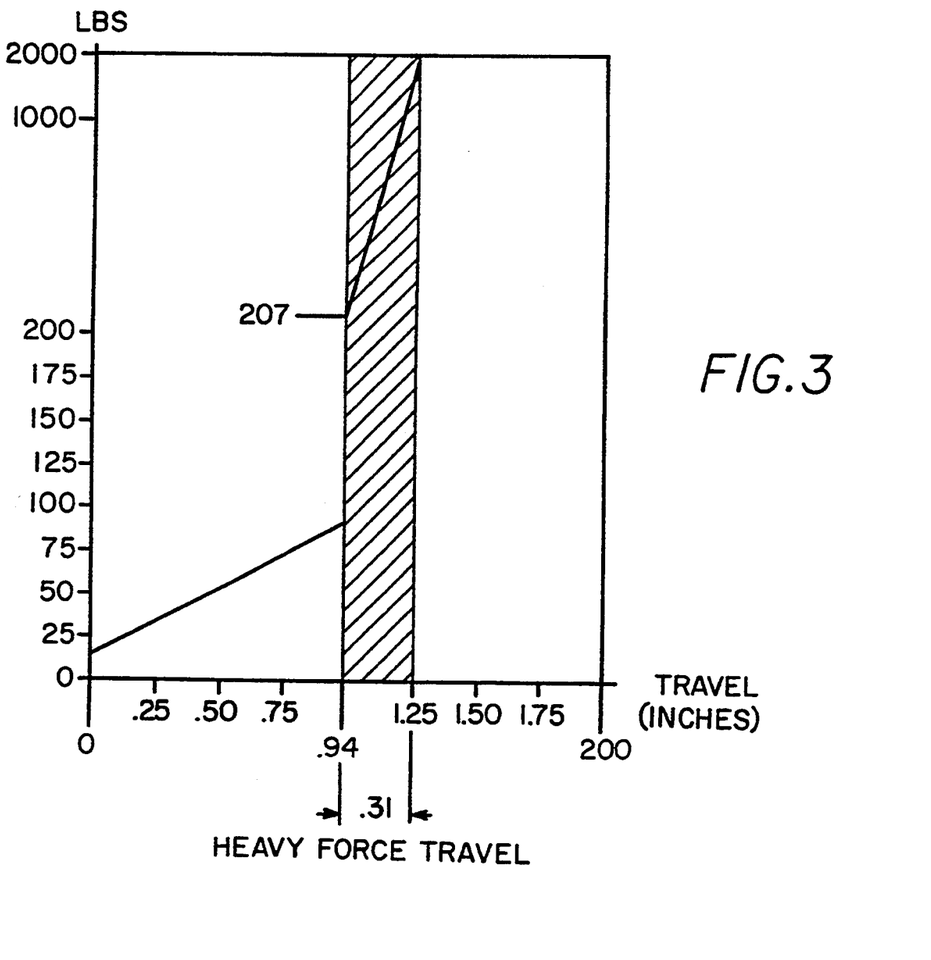
FIG. 3 is a force-compression chart illustrating the two stage spring assembly's axial compression under increasing force.

The levels of force required to compress the spring assembly 20 may be more readily understood with reference to the chart shown in FIG. 3. FIG. 3 is representative of the levels of force required to compress a spring assembly of the geometry illustrated in FIGS. 2A–D. During the initial stages of compression, the force 74 required is a function of the low force spring 70. The initial stages of compression are best represented by the section of the chart showing travel from zero to approximately 0.70 inches. During this period of travel, a force on the order of 60 pounds is required to compress the spring assembly 20 approximately 0.70 inches.

During the final stages of compression, the force required to compress the spring assembly 20 is controlled by the high force spring 72. This is because the high force spring 72 displays a much higher spring rate than that of the low force spring 70. The intermediate and final stages of compression may best be illustrated by the section of the chart showing travel in excess of approximately 0.70 inches. It will be seen that the level of force required in the transitional and final stages of compression far exceeds the level of force required during the initial stages. The final "heavy force travel" may be defined as the travel between 1.00 and 1.25 inches. To compress the spring assembly 20 during the "heavy force travel," a force 74 building from 207 pounds to 2000 pounds is required.

It will be observed that this low force/high force spring cycle makes the invention ideally suited for cam operations such as trimming, punching, flanging, forming and restriking. The design of the spring assembly 20 optimizes the low force spring 70 to provide sufficient, but not excessive force, and sufficient axial compression capability to move the slide block 12 into and out of position to operate on the work piece during the downstroke and retrieval stages of operation. It also optimizes the high force capabilities of the high force spring 72 to provide sufficient force to perform the actual tooling operation.

Returning now to FIGS. 2A–D, the preferred structure of the spring assembly components 24, 26 as they relate to the low and high force springs 70, 72 will be described. Turning first to the low force spring 70, coil springs are particularly suited to provide the compression characteristics desired during the initial compression. Consequently, the low force spring 70 preferably comprises a single coil spring or multiple coil springs, which may be arranged in series or parallel. Although coil springs are preferred, it will be appreciated that any other type of spring that provides a relatively low spring rate could also be used in this capacity.

The embodiment illustrated in FIGS. 2A–D includes two coil springs 70a, 70b arranged in series. To maintain the ends of the springs 70a, 70b in the proper position within the casing 22, recesses or bores 76, 78 are provided in the plug 50 and the inner telescoping component 26 at the proximal and distal ends 20p, 20d of the spring assembly 20, respectively. It will be appreciated that a longer spring or springs may be utilized to provide a desired compression rate if deep bores 76, 78 are included at the ends 20p, 20d of the assembly 20, as in the illustrated embodiment.

In order to keep the coil springs 70a, 70b in alignment during operation, a centering rod 82 or alternate alignment assistance device may be provided. A centering rod 82 or the like is particularly desirable if the low force spring 70 comprises a relatively long coil spring or multiple coil springs in series, as in the illustrated embodiment. While the centering rod 82 may be secured to the casing 22 at any appropriate location, in the illustrated embodiment, the centering rod 82 is threaded into the distal end 26d of the inner telescoping component 26. To provide this engagement, the distal end 82d of the centering rod 82 is threaded, and the inner telescoping member 26 includes a bore 84 having mating threads. The centering rod 82 may also include a countersunk hole (not shown) that may be accessed through the bore 84 to adjust the position of the centering rod 82 within the casing 22. It will be appreciated that the distance of travel for which the spring assembly 20 is designed is limited by the length and location of the centering rod 82.

Turning now to the structure of the high force spring unit 72, the preferred springs for use in the high force spring 72 are Belleville springs. Stacked in series, Belleville springs can produce forces on the order of one ton with compression distances of about one-third of an inch. It will be appreciated, however, that other types of springs that exhibit relatively high spring rates such as universal loading springs may alternately be suitable in this capacity.

In the illustrated embodiment, the high force spring 72 is disposed about the annular surface of the low force spring 70, within the central cavity 60 of the outer telescoping component 24. As previously mentioned, the tubular structure 42 of the outer telescoping component 24 is provided with a stepped inner diameter 52, 54 which forms a flange or annular shoulder 56 therebetween. The high force spring 72 is positioned within the cavity 60 in the area 52 having the larger of the diameters, the annular shoulder 56 being disposed at one end of the spring 72, and the plug 50 being disposed at the opposite end of the spring 72. To assist in maintaining the spring 72 in this position, an annular disk 86 is disposed between the high force spring 72 and the shoulder 56. In this configuration, the disk 86 serves to evenly distribute forces against the end surface of the high force spring 72. Moreover, the disk 86 is slidably disposed within the outer telescoping component 24 such that pressure may be applied to the disk 86 to compress the high force spring 72. Thus, the disk 86 acts as an internal telescoping member.

According to another important aspect of the invention, the high force spring 72 may be preloaded within the central cavity 60 of the casing 22 to a desired force level. Such preloading is facilitated by the relationship of the spring 72, the inner and outer telescoping components, 26, 24, the plug 50 and the disk 86. By preloading the high force spring 72 to a desired force level, the ultimate performance characteristics of the spring assembly 20 may be selected. Moreover, by selecting the appropriate level of precompression for the springs utilized in the spring 72, the springs may be prevented from becoming fully released. Additionally, a high force spring having an appropriate spring force, as well as the relative dimensions of the inner and outer telescoping components 26, 24, the plug 50 and the disk 86 are preferably chosen so that the springs are not permitted to over compress. As a result, the axial compression of the high force spring 72 thus remains within the parameters that maximize the life of the springs.

In this embodiment, the inner surface 88 of the smaller inner diameter section 54 of the outer telescoping component 24 is only slightly larger than the flange 48 of the inner telescoping component 26. Consequently, as the telescoping components 24, 26 move from the position shown in FIG. 2B to the position shown in FIG. 2C, the flange 48 cooperates with the inner surface 88 of the outer telescoping component 24.

In operation, the spring assembly 20 will receive a load (represented by arrows 74 in FIGS. 2B-2D). Due to the specific geometry of the embodiment illustrated in FIGS. 2A-D, when a sufficient load 74 is applied to the invention, the low force spring 70 will be the first to compress, moving from the position shown in FIG. 2B to the position shown in FIG. 2C. As the low force spring 70 compresses, the inner telescoping component 26 of the casing 22 slidably telescopes into the outer telescoping component 24. After sufficient force has been applied, the telescoping components 24, 26 reach the position shown in FIG. 2C. At this position, the inner telescoping component 26 contacts the disk 86.

As the relative movement of the telescoping components 24, 26 continues toward the position illustrated in FIG. 2D, the inner telescoping component 26 bears against and moves the disk 86 toward the proximal end 20p of the assembly 20 to compress the high force spring 72. It should be noted that the length of the centering rod 82 can be chosen such that the centering rod 82 abuts plug 50 before any of the springs of the spring assembly 20 are overly compressed and the life of the springs are thereby maximized. It should further be noted that it is during the final stages of compression that an extremely high level of force is required to compress the spring assembly 20 a very small distance. As previously explained, this distance of travel may be referred to as "heavy force travel," as illustrated in FIG. 3. When the load 74 is removed the high force spring 72 and the low force spring 70 expand back to their preloaded free length.

In accordance with a further aspect of the invention, a third stage can be added to the spring assembly. The addition of this third stage enables the spring assembly to provide even higher forces with longer axial compression distances than in the preferred, two stage embodiment of FIGS. 2A-D. A second embodiment of the invention, which incorporates such a third stage, is illustrated in FIGS. 4A-E. While the spring assembly 120 illustrated in FIGS. 4A-E is substantially similar to the assembly 20 illustrated in FIGS. 2A-D, this embodiment contains certain components and exhibits certain performance characteristics that may differ from those related to the first embodiment. These differences will be explained in more detail below. For ease of identification, the same reference numerals prefaced by the number "1" will be used to identify the like components of the spring assembly (i.e., 1XX). New reference numerals will likewise be prefaced by the number "1" (i.e., 1XX).

As in the two stage spring assembly 20 shown in FIGS. 2A-D, the casing 122 of the three stage spring assembly 120 contains springs of varying force-compression characteristics. However, in this embodiment, the spring assembly 120 includes three internal springs, a low force spring 170, an intermediate force spring 171 and a high force spring 172. Consequently, the resultant load/compression diagram will be slightly different than that illustrated in FIG. 3.

The low force spring 170 has characteristics similar to the low force spring 70 of the two stage assembly 20 and is disposed in a substantially similar position. The low force spring 170 compresses axially to permit the assembly 120 to telescope relatively large distances when subjected to relatively low axial forces. The low force spring 170 preferably comprises a coil spring.

However, it will be appreciated that any other type of spring exhibiting large axial compression distances at low forces might also be appropriate.

The intermediate spring 171 also preferably comprises a coil spring. The intermediate spring 171, however, exhibits a higher spring rate, and, therefore, compresses shorter axial distances when subjected to higher forces than the low force spring 170. In this embodiment, the low and intermediate force springs 170, 171 are chosen such that the intermediate spring 171 will not compress when subjected to forces that are sufficient to compress the low force spring 170. Accordingly, a coil spring having a higher spring constant than the low force spring 170 is preferably used. It will again be observed that other types of springs exhibiting the desired performance characteristics, i.e., a higher spring rate than the low force spring 170, might also be appropriate.

The high force spring 172 is substantially similar to the high force spring 72 used in the two stage spring assembly 20. Thus, the high force spring 172 exhibits a relatively large spring rate; compressing short axial distances when subjected to heavy forces. As in the two stage embodiment, the high force spring 172 preferably comprises Belleville springs stacked in series. It will be appreciated, however, that other types of springs exhibiting similar axial compression characteristics when subjected to high forces might also be appropriate.

As shown in FIGS. 4B–E, in order to permit compression of the spring assembly 120, the casing 122 comprises multiple telescoping components, which are slidably coupled together for relative movement. In addition to the outer telescoping component 124 and the inner telescoping component 126, which function similarly to the outer and inner telescoping components 24, 26 of the first embodiment, the casing 122 also comprises first and second internal telescoping components 128, 129. The structural relationship of the components 124, 126, 128, 129 permit the telescoping movement of the spring assembly 120 while securing the components of the assembly 120 together as a single, self-contained unit. The means for restricting the extended position of the components of the spring assembly 120 comprises a series of engaging flanges and a retaining rod. The structure and interaction of the telescoping components 124, 126, 128, 129 will become apparent from the following explanation of the location and actuation of the springs 170, 171, and 172.

As in the first embodiment, the high force spring 172 is disposed within the cavity 160 in the outer telescoping component 124, and is preferably preloaded between the flange or annular shoulder 156 and the plug 150. Likewise, a disk 186, which is slidably disposed within the cavity 160 engages the annular shoulder 156 to assist in maintaining the spring 172 in position. In this embodiment, however, the disk 186 is disposed about the circumference of, and preferably formed integrally with, the first internal telescoping component 128. The first internal telescoping component 128 further comprises a body 131, which forms an internal shoulder 133, a tubular extension 135, and a plug 137, which is secured to the proximal end 135p of the tubular extension 135 by threads or similar means. The high force spring 172 is disposed about the tubular extension 135.

It will also be observed that the plug 150 of the outer telescoping component 124 is provided with a bore 176 in which the proximal end 135p of the tubular extension 135 is slidably disposed. Thus, as the high force spring 172 is compressed, the axial movement of the first internal telescoping member 128 in the proximal direction is not restricted in that the proximal end 135p of the tubular extension 135 is free to slide through the bore 176.

The second internal telescoping component 129 preferably comprises two components, a body 141 and a retaining tube 143. The body 141 comprises a cup-shaped portion 145 and a radially extending flange 147, and is slidably disposed within the cup-shaped inner telescoping member 126. As will be seen from the drawings, the intermediate spring 171 is disposed about the outer surface 149 of the cup-shaped portion 145; the proximal end 171p of the spring 171 is disposed adjacent to the radially extending flange 147, and the distal end 171d of the spring 171 is disposed adjacent to the inside surface 153 of the head 140 of the inner telescoping member 126.

According to an important aspect of the invention, the intermediate spring 171 may be preloaded to a desired level. In this embodiment, preloading of the intermediate spring 171 is accomplished by positioning the spring 171 within the inner telescoping component 126, and coupling the body 141 and the inner telescoping component 126 together. By so coupling the body 141 and the telescoping component 126, the relative movement of the flange 147 and the head 140, and, therefore, the proximal and distal ends of the spring 171p, 171d are limited. It will be appreciated that when the components are properly assembled and the coupling means properly engaged, they form a first subassembly 155 which comprises the second internal telescoping component 129, the inner telescoping component 126, the intermediate spring 171, and the coupling means.

In this embodiment, the inner telescoping component 126 and the second internal telescoping component 129 are coupled together by a retaining rod 157, which is disposed such that it permits a limited sliding movement of the inner telescoping component 126 and the body 141 relative to one another. The rod 157 is secured to the inner telescoping component 126 and disposed such that it may slide within a bore 159 provided in the second internal telescoping component 129. The axial sliding movement is limited by the head 140, which seats against the inside surface 161 of the second internal telescoping member 129. The rod 157 may be coupled to the inner telescoping component 126 by any appropriate means, such as threads 164, or the like. The exposed outer peripheral surface 163 of the rod 157 is preferably relatively smooth so that the bore 159 may slide freely along the surface.

The other portion of the second internal telescoping member 129, the retaining tube 143, may be coupled to the body 141 by any appropriate means. In the embodiment illustrated, the tube 143 and the body 141 are coupled by threads. While other coupling means are suitable, the illustrated embodiment is preferable in that the components may be easily threaded together to assemble the retaining tube 143 to the first subassembly 155.

It will be seen from the figures that the components of the spring assembly 120 are assembled such that the retaining tube 143 of the second internal telescoping component 129 is slidably disposed within and guided by the tubular extension 135 of the first internal telescoping component 128. In this way, the internal telescoping components 128, 129 form an internal cavity 166. The low force spring 170 is disposed within this cavity 166 such that the spring 170 compresses or expands as the components 128, 129 telescope. Thus, it can be seen that the combination of the first internal telescoping component 128, the retaining tube 143, plug 137 and the low force spring 170 forms a second subassembly 168.

It will also be seen from the figures that the inner telescoping component 126 is slidably disposed within the outer telescoping component 124, and, further, that the first and second subassemblies 155, 168 are also slidably disposed one within the other. A coupling means is provided in order to couple the subassemblies 155, 168 together to form the spring assembly 120. To couple the outer and inner telescoping components 124, 126, and, therefore, the subassemblies 155, 168 together, the retaining tube 143 is provided with an annular shoulder 165. When assembled, the annular shoulder 165 engages the internal shoulder 133 of the first internal telescoping component 128 to prevent the subassemblies 155, 168 from becoming disengaged. According to another important aspect of the invention, this engagement of the shoulders 165, 133 couples the internal telescoping components 128, 129 together such that the low force spring 170 may be preloaded when the spring assembly 120 is in the free state shown in FIG. 4B. Further, the engagement of the annular shoulders 165, 133, along with the engagement of the annular shoulder 156 of the outer telescoping component 124 and the disk 186, and the retaining rod 157 maintain the spring assembly 120 as a self-contained unit.

A number of methods may be used to assemble the three stage embodiment 120 shown in FIGS. 4A–E. For example, the first and second subassemblies 155, 168 may be preassembled separately and then coupled together such that they form a unit. It will be appreciated, however, that alternate assembly methods are likewise appropriate.

In order to preassemble the first subassembly, 155, the intermediate spring 171 is positioned between the body 141 of the second internal telescoping component 129 and the head 140 of the inner telescoping component 126. The retaining rod 157 is then inserted through the bore 159 and threaded into the inner telescoping component 126.

In order to preassemble the second subassembly, 168, the body 131 and the tubular extension 143 of the first internal telescoping component 128 are positioned within the tubular structure 142 of the outer telescoping component 124 with the disk 186 which may be integrally formed with the body 131 engaging the shoulder 156. At this point, neither the plug 150 nor the plug 137 are disposed within the tubular structure 142 or first internal telescoping component 128, respectively. The high force spring 172 may then be positioned between the tubular structure 142 and the tubular extension 135. The high force spring 172 may then be preloaded by pressing the plug 150 into position and securing the plug 150 to the tubular structure 142. Although the plug 150 may be secured in many ways, it is preferable to provide mating threading on both the tubular structure 142 and the plug 150. The plug 150 may then be threaded into the tubular structure 142 and spot welded to insure a permanent seal.

Once the subassemblies 155, 168 are completed, the second subassembly 168 may be positioned within the opening at the distal end 124d of the outer telescoping component 124. The subassemblies 155, 168 may then be coupled together by moving the retaining tube 143 through the opening 167 in the proximal end 135p of the tubular extension 135 of the first internal telescoping component 128, and threading the retaining tube 143 to the body 141 of the second internal telescoping component 129. The low force spring 170 may then be positioned within the internal telescoping components 128, 129, and the plug 137 engaged with the tubular extension 135 of the second internal telescoping component 129 to complete the spring assembly 120.

Alternate methods of assembling the spring assembly 120 may likewise be appropriate. For example, the second subassembly 168 may first be assembled and disposed within the tubular structure 142 of the outer telescoping component 124. The first internal telescoping component 128 and the retaining tube 143, along with the low force spring 170 may then be assembled to the body 141 of the second internal telescoping component 129. The high force spring 172 may then be positioned within the outer telescoping component 124 and the plug 150 assembled into and coupled to the tubular structure 142 to complete the unit. This order of assembly is advantageous in that the high force spring 172 is preloaded last.

Figure 4A:
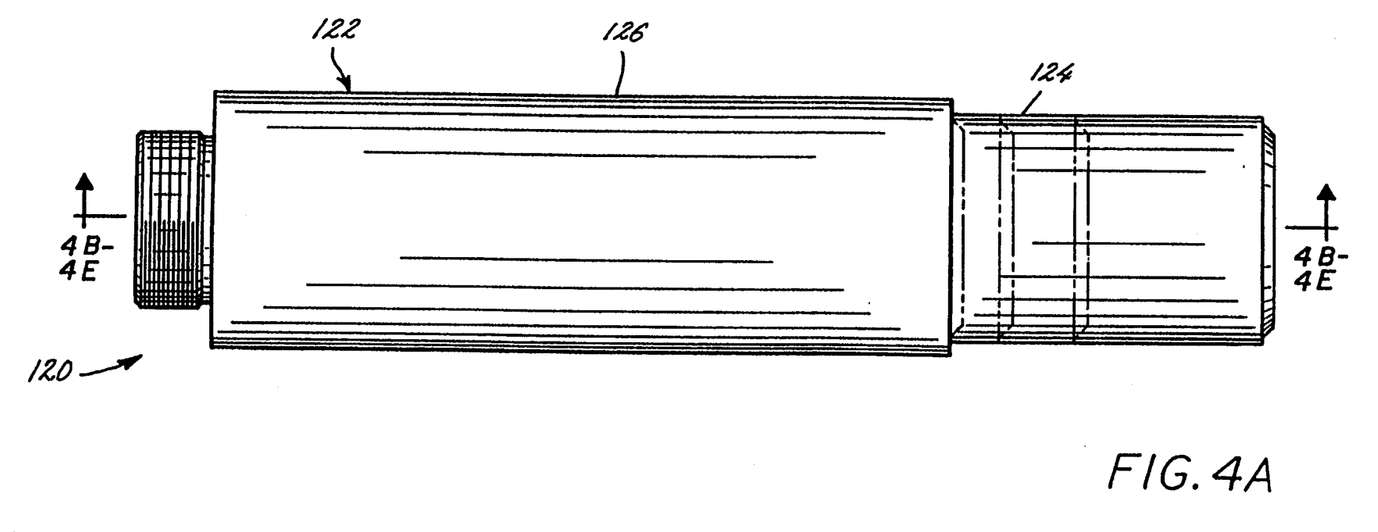
FIG. 4A is an elevational view of a second embodiment of the spring assembly constructed in accordance with teachings of the invention; this three stage version of the spring assembly is shown in its free length state in solid lines and in compressed positions in phantom lines.
Figure 4B:
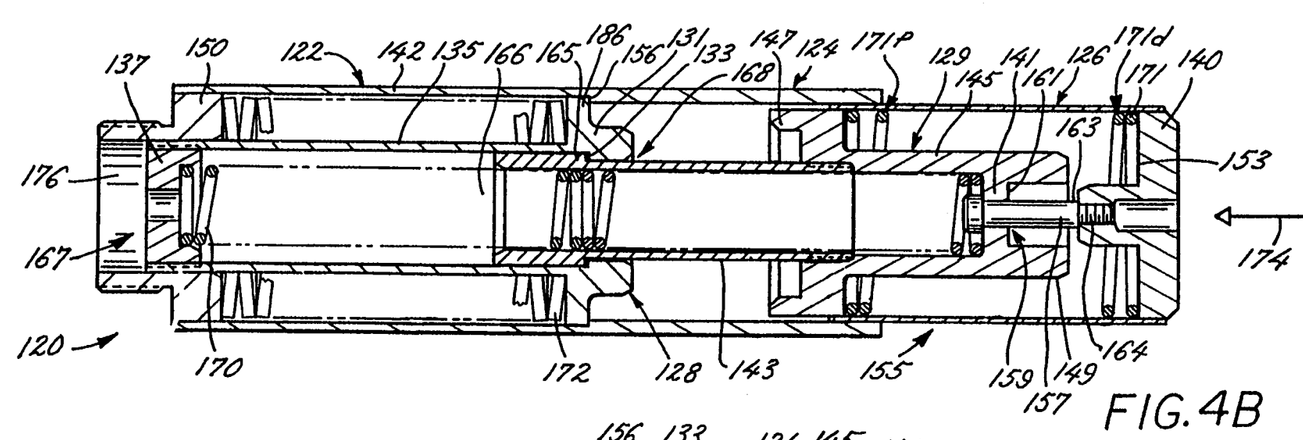
FIG. 4B is a cross-sectional view of the spring assembly in the free length state taken along line 4B—4B of FIG. 4A.
Figure 4C:
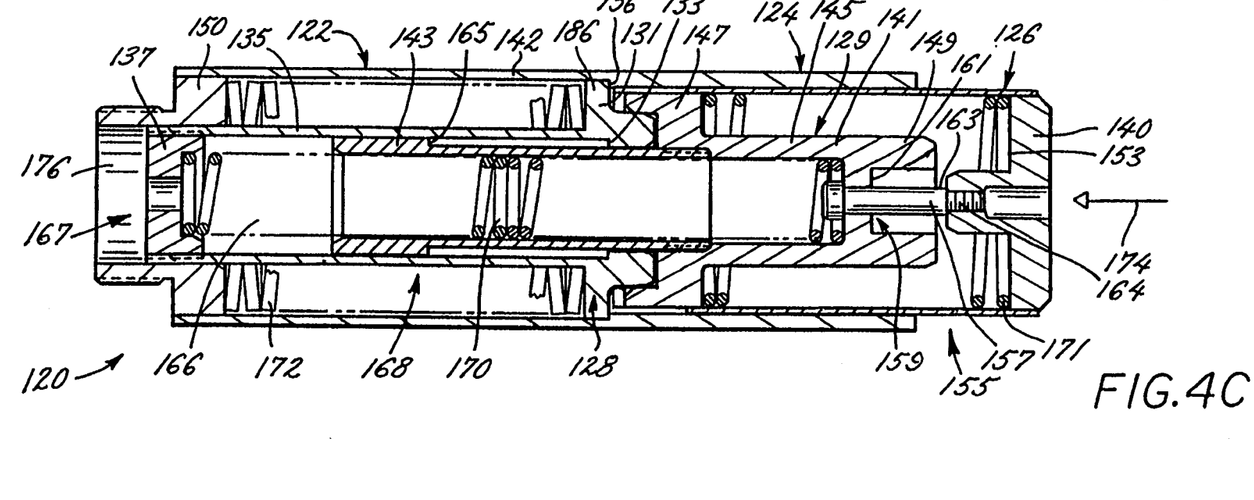
FIG. 4C is a cross-sectional view similar to FIG. 4B, but illustrating the spring assembly in an intermediate state of compression.

In operation, the assembly 120 initially receives a load as represented by arrow 174 in FIGS. 4B–E. When load 174 is greater than the spring constant of low force spring 170, the low force spring 170 begins to compress. As a result, the second internal telescoping component 129 and the inner telescoping component 126 will telescope as a unit into the outer telescoping component 124. The retaining tube 143 will slide into the second internal telescoping component 129 as the low force spring 170 compresses. This will continue until the second internal telescoping component 129 abuts the first internal telescoping component 128, as illustrated in FIG. 4C.

Figure 4D:
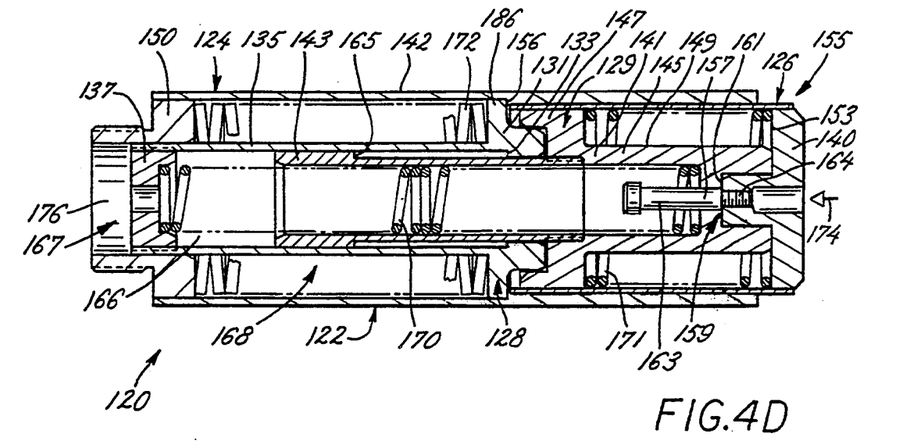
FIG. 4D is a cross-sectional view similar to FIG. 4C, but illustrating the spring assembly in a second intermediate state of compression.

At the position shown in FIG. 4C, the high force spring 172 will prevent the second internal telescoping component 129 from telescoping further in the proximal direction. Consequently, the load 174 begins to compress the intermediate spring 171. As this spring 171 compresses, the inner telescoping component 126 will telescope further into the outer telescoping component 124. Since the second internal telescoping component 129 is unable to further telescope at this time, the retaining rod 157 will slide through the bore 159 in the body 141 and the inner telescoping component 126 will continue to compress, sliding relative to the second internal telescoping component 129 until the components 126, 129 engage. As illustrated in FIG. 4D, the engagement of the second internal telescoping component 129 and the inner telescoping component 126 will prevent further compression of the intermediate spring 171.

Figure 4E:
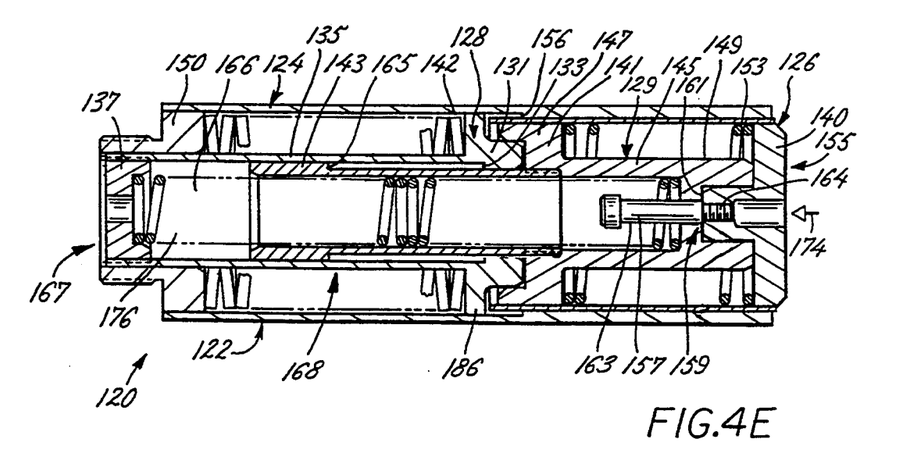
FIG. 4E is a cross-sectional view taken along line 4E—4E in FIG. 4A, illustrating the spring assembly in its fully compressed state.
Figure 5A:
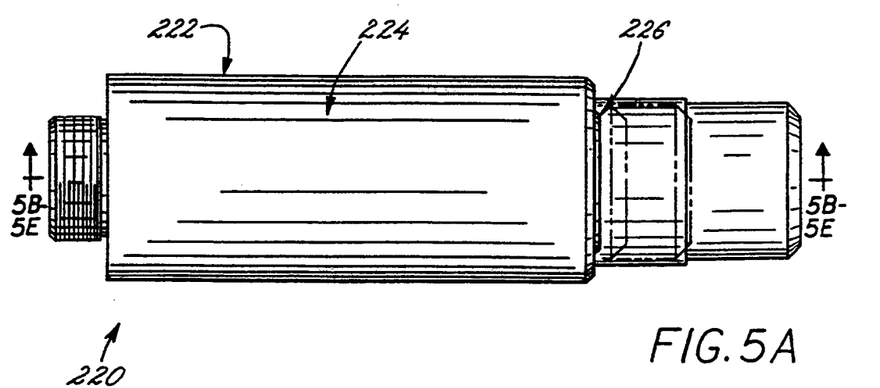
FIG. 5A is an elevational view of a third embodiment of the spring assembly constructed in accordance with teachings of the invention wherein the three staged version of the spring assembly is shown in its free length state in solid lines and in compressed positions in phantom lines.
Figure 5B:
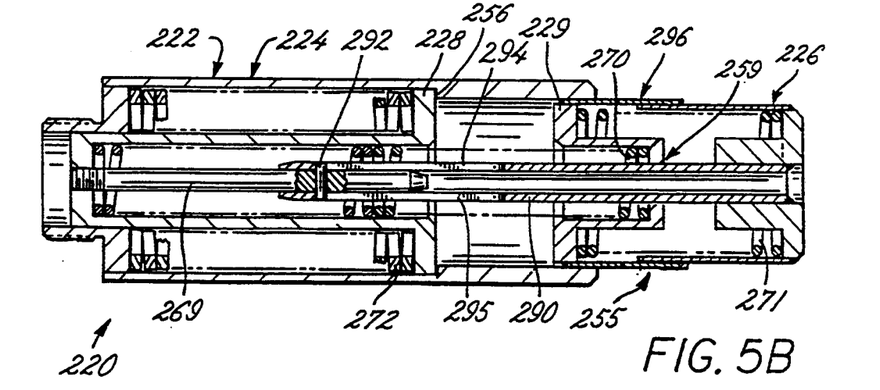
FIG. 5B is a cross-sectional view of the spring assembly taken along lines 5B—5B of FIG. 5A.
Figure 5C:
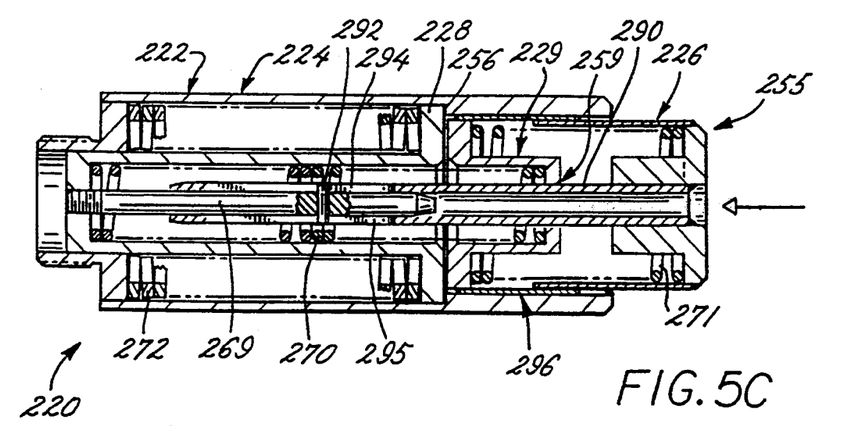
FIG. 5C is a cross-sectional view similar to FIG. 5B illustrating a first intermediate state of compression.
Figure 5D:
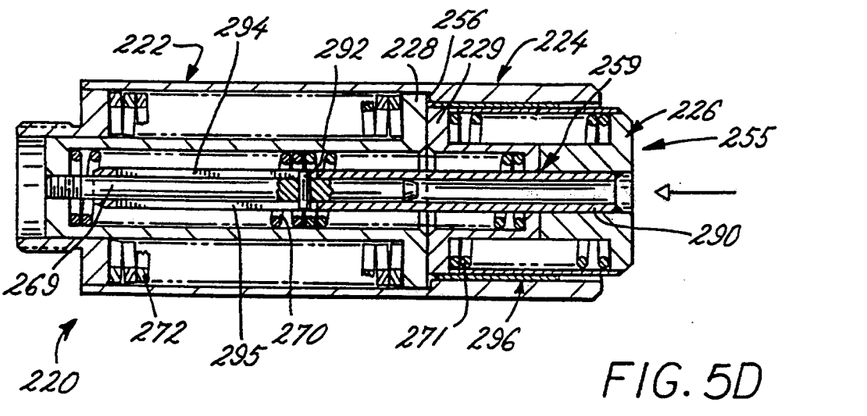
FIG. 5D is a cross-sectional view similar to FIG. 5C illustrating a second intermediate state of compression.
Figure 5E:
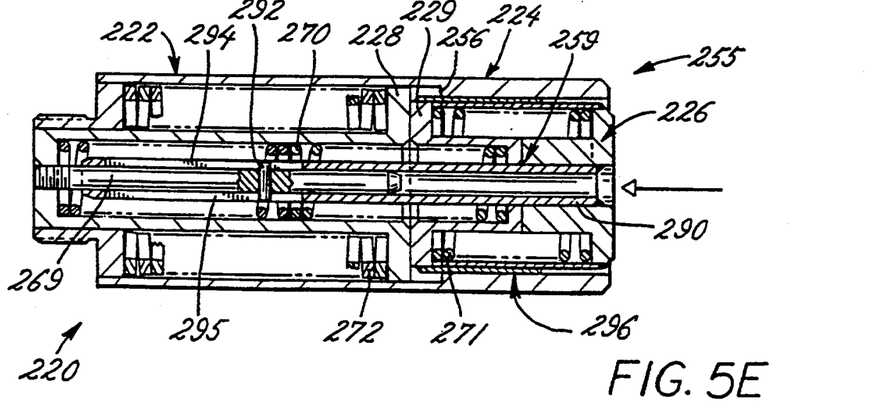
FIG. 5E is a cross-sectional view taken along line 5E—5E in FIG. 5A illustrating the spring assembly in its fully compressed state.

At the position illustrated in FIG. 4D, neither the intermediate spring 171 nor the low force spring 170 can be further compressed. Accordingly, the load 174 is effectively shifted to the high force spring 172. When a sufficient load 174 is applied, the high force spring 172 compresses, as illustrated in FIG. 4E. As the high force spring 172 compresses, the first and second internal telescoping components 128, 129 and the inner telescoping component 126 telescope into the outer telescoping component 124 as a unit. This telescoping will continue until the proximal end 128p of the first internal telescoping component 128, i.e., the plug 137, is flush with the inner surface of the plug 150, as illustrated in FIG. 4E. At this point, no further compression of any of the internal springs will be possible. As already mentioned, the dimensions of the casing's components 124, 126, 128, 129 are chosen such that this finally compressed state illustrated in FIG. 4E is achieved before any of the internal springs are overly compressed.

The three stage spring assembly 120 has similar force/compression characteristics as the two stage spring assembly 20. It provides low axial compression distances and high resistance when it nears full compression and large axial compression distances and relatively low resistance at all other stages of compression. Consequently, it too is ideal for use in cam operations. However, the three stage assembly 120 supplies even larger forces and longer axial compression distances than the two stage, assembly 20. Thus, it can be used with larger and more powerful cam units.

FIGS. 5A-E illustrate an alternate embodiment of the three stage spring assembly. While the structure and operation of the spring assembly 220 illustrated in FIGS. 5A-E is substantially similar to the assembly 120 illustrated in FIGS. 4A-E, this embodiment has a shorter overall freelength, and, accordingly, is susceptible to shorter axial compression distances. As with the second embodiment, this three stage spring assembly 220 generates higher forces than the two stage spring assembly 20 of FIGS. 2A-D. For ease of identification, reference numerals prefaced by the number "2" will be used to identify the like components of the spring assembly (i.e., 2XX). New reference numerals will likewise be prefaced by the number "2" (i.e., 2XX).

As in the three stage spring assembly 120 shown in FIGS. 4A-E, the casing 222 of the three stage spring assembly 220 houses three internal springs, a low force spring 270, an intermediate force spring 271, and a high force spring 272. The characteristics and general location, as well as actuation of the springs 270, 271, 272 are similar to those utilized in the embodiment of FIGS. 4A-E. Consequently, similar springs will be appropriate.

The casings 222 of the spring assembly 220 likewise comprises an outer telescoping component 224, an inner telescoping component 226, and first and second internal telescoping components 228, 229, which are slidably coupled together to provide the telescoping movement of the spring assembly 220. The means for limiting the freelength or extended position of the components of the spring assembly 220, however, differs slightly from the limiting means of the second assembly 120. More specifically, the inner telescoping component 226 is coupled directly to the first internal telescoping component 228, rather than through an engaging flange arrangement between the first and second internal telescoping components 228, 229. As in the first and second embodiments, however, the first internal telescoping component 228 engages a flange or annular shoulder 256 along the inner diameter of the outer telescoping member 224 to secure the components 224, 226, 228, 229 together as a single, self-contained unit.

The first internal telescoping member 228 is provided with a rod 269 which extends from and is secured to the proximal end 228p of the first internal telescoping member 228. Similarly, the inner telescoping member 226 is provided with an elongated tube 290, which is secured thereto. When assembled, the elongated tube 290 is slidably disposed within the bore 259 in the second internal telescoping component 229, and about the rod 269. In this way, as the assembly 220 is compressed, the tube 290 slides along the outer surface of the rod 269 to facilitate controlled relative movement of the components.

In order to limit the extended or freelength position of the assembly 220, a coupling pin 292 is secured to the rod 269, protruding outward from its annular surface. To further define the range of relative movement of the first internal telescoping component 228 and the inner telescoping component 226, the tube 290 is provided with elongated slots 294, 295 in which the coupling pin 292 may slide.

While the structure of the second internal telescoping component 229 is substantially similar to the component 129 of the second embodiment, the component 229 is further provided with a tube-like extension 296 which extends toward the distal end of the assembly 220, about the inner telescoping component 226. In this way, when the assembly 220 is in the freelength position shown in FIG. 5B, the tube-like extension 296 along with the inner telescoping component 226 encases the intermediate force spring 271 to protect it from the environment.

The assembly operates in a manner similar to the second embodiment, and can be similarly assembled. In this embodiment, however, to assemble a first subassembly 255, the intermediate force spring 271 is positioned between the inner telescoping component 226 and the second internal telescoping component 229. The low force spring 270 is then positioned between the first and second internal telescoping components 228, 229, positioning the rod 269 within the tube 290. The coupling pin 292 is then inserted to secure the subassembly 255 together. The subassembly 255 is then positioned within the outer telescoping component 224, the high force spring 272 positioned, and the plug 250 installed to complete the unit 220.

It will be appreciated that the inventive spring assemblies provide versatile, compact, high force devices for use in cam assemblies, trim pressure pads or anywhere else where such performance is desirable. The spring assemblies do not waste valuable manufacturing line space or require expensive support systems. Consequently, the spring assemblies provide a low cost alternative to using gas springs in cam operations.

I claim:

1. A variable force spring assembly for use in a cam unit, the spring assembly supplying increasing resistance when subjected to an external axial force and comprising, in combination:

a casing having at least two slidably coupled telescoping components adapted to move between an extended position and a compressed position when subjected to the axial force, the casing defining at least one internal cavity, means for restricting the extended position of the casing, a low force spring having a relatively low spring rate such that the low force spring compresses relatively large distances when subjected to a relatively low axial force, a high force spring having a relatively high spring rate such that the high force spring compresses relatively small distances when subjected to a relatively high axial force, the low and high force springs being disposed within the internal cavity such that as the casing components move between the extended and the compressed positions the low force spring substantially compresses before the high force spring compresses, the high force spring being restricted in a preloaded condition by an internal structure of at least one of the telescoping components.

2. The variable force spring assembly as claimed in claim 1 wherein the high force spring comprises Belleville springs.

3. The variable force spring assembly as claimed in claim 1 wherein the high force spring comprises universal loading springs.

4. The variable force spring assembly as claimed in claim 1 wherein the low force spring comprises at least one coil spring.

5. The variable force spring assembly as claimed in claim 1 wherein the casing comprises an outer telescoping component and an inner telescoping component, the outer and inner telescoping components being cup shaped and having substantially adjacent open ends.

6. The variable force spring assembly as claimed in claim 5 wherein the means for restricting the extended position of the casing comprises an outwardly extending flange disposed at an end of the inner telescoping component which engages an inwardly extending flange disposed at an end of the outer telescoping component.

7. The variable force spring assembly as claimed in claim 6 wherein the outer telescoping component further comprises an inwardly directed shoulder, and the spring assembly further comprises a disk which is disposed to abut the inwardly directed shoulder, the high force spring being disposed within the internal cavity between the closed end of the cup shaped outer telescoping component and the disk, the open end of the cup shaped inner telescoping component contacting the disk to compress the high force spring after the low force spring has been compressed.

8. The variable force spring assembly as claimed in claim 1 wherein the casing comprises three telescoping components.

9. The variable force spring assembly as claimed in claim 8 further comprising an intermediate force spring having a spring rate intermediate those of the low and high force springs, the intermediate force spring being disposed within the internal cavity of the casing such that the intermediate force spring begins to compress after the low force spring begins to compress, but before the high force spring begins to compress.

10. The variable force spring assembly as claimed in claim 9 wherein the casing further comprises an internal telescoping component, the low force spring being disposed between a first telescoping component and a second telescoping component, the intermediate force spring being disposed between the second telescoping component and a third telescoping component, and the high force spring being disposed between the first telescoping component and the internal telescoping component.

11. The variable force spring assembly as claimed in claim 10 wherein the first telescoping component includes an inwardly directed annular shoulder and a closed end portion, the internal telescoping component includes an outwardly extending disk portion and an axially extending rod, the rod including a substantially radially extending pin, the second telescoping component includes a bore and a tube-like extension, and the third telescoping component includes a closed end portion and an axially extending tube slidably extending through the bore of the second telescoping component, the axially extending tube including a slot having an axial length, the axially extending tube being slidably disposed about the axially extending rod, the pin of the axially extending rod being disposed within the slot of the axially extending tube such that the axial length of the slot limits the relative telescoping movement of the internal telescoping component and the third telescoping component, the outwardly extending disk portion of the internal telescoping component engaging the inwardly directed annular shoulder of the first telescoping component to limit the relative movement of the first telescoping component and the internal telescoping component, the tube-like extension of the second telescoping component slidably receiving the third telescoping component to encase the intermediate force spring, said engagements restricting the extended position of the casing.

12. The variable force spring assembly as claimed in claim 1 wherein the means for restricting the extended position of the casing comprises an inwardly extending flange along an internal surface of at least one of the telescoping components and an outwardly extending flange along the outside of the other telescoping component, the flanges engaging to limit travel of the telescoping components in one axial direction.

13. The variable force spring assembly as claimed in claim 12 wherein the means for restricting the extended position of the casing further comprises an axially extending restraining rod having a head portion and being coupled to one telescoping component, and an opening within another telescoping component, the rod slidably extending through the opening, the head portion disposed along the rod to limit the sliding of the rod within the opening.

14. The variable force spring assembly as claimed in claim 12 wherein the means for restricting the extended position of the casing further comprises an axially extending rod coupled to one telescoping component, a substantially radially extending pin coupled to the rod, an axially extending tube coupled to another telescoping component and having an axially extending slot, the axially extending tube being slidably disposed about the axially extending rod, the pin being disposed within the slot such that the axial length of the slot limits the telescoping movement of the components.

15. The variable force spring assembly as claimed in claim 1 wherein the means for restricting the extended position of the casing comprises an axially extending restraining rod having a head portion and being coupled to one telescoping component, and an opening within another telescoping component, the rod slidably extending through the opening, the head portion disposed along the rod to limit the sliding of the rod within the opening.

16. The variable force spring assembly as claimed in claim 1 wherein the means for restricting the extended position of the casing comprises an axially extending rod coupled to one telescoping component, a substantially radially extending pin coupled to the rod, an axially extending tube coupled to another telescoping component and having an axially extending slot, the axially extending tube being slidably disposed about the axially extending rod, the pin being disposed within the slot such that the axial length of the slot limits the telescoping movement of the components.

17. The variable force spring assembly as claimed in claim 1 further comprising an intermediate force spring having a spring rate intermediate those of the low and high force springs, the intermediate force spring being disposed within the internal cavity of the casing such that the intermediate spring begins to compress after the low force spring begins to compress, but before the high force spring begins to compress.

18. The variable force spring assembly as claimed in claim 17 wherein the casing comprises first, second, third and fourth telescoping components, the low force spring being disposed between the first and the third telescoping components, the intermediate force spring being disposed between the third and the fourth telescoping components, and the high force spring being disposed between the first and the second telescoping components.

19. The variable force spring assembly as claimed in claim 18 wherein the first telescoping component includes an inwardly directed annular shoulder and a closed end portion, the second telescoping component includes an outwardly extending disk portion and an internal shoulder, the third telescoping component includes an outwardly extending shoulder, a bore and an axially extending retaining tube having an annular shoulder, and the fourth telescoping component includes a closed end portion and an axially extending rod having a head portion, the rod slidably extending through the bore of the third telescoping component, the head portion disposed along the rod to engage the third telescoping component to limit the sliding of the rod within the bore, the annular shoulder of the axially extending retaining tube of the third telescoping component engaging the internal shoulder of the second telescoping component to limit the relative telescoping movement of the second and third telescoping components, the outwardly extending disk portion of the second telescoping component engaging the inwardly directed annular shoulder of the first telescoping component to limit the relative movement of the first and the second telescoping components, said engagements restricting the extended position of the casing.

20. The variable force spring assembly as claimed in claim 18 wherein the first telescoping component includes an inwardly directed annular shoulder and a closed end portion, the second telescoping component includes an outwardly extending disk portion and an axially extending rod, the rod including a substantially radially extending pin, the third telescoping component includes a bore and a tube-like extension, the fourth telescoping component includes a closed end portion and an axially extending tube slidably extending through the bore of the third telescoping component, the axially extending tube including a slot having an axial length, the axially extending tube being slidably disposed about the axially extending rod, the pin of the axially extending rod being disposed within and engaging the slot of the axially extending tube such that the axial length of the slot limits the relative telescoping movement of the second telescoping component and the fourth telescoping components, the outwardly extending disk portion of the second telescoping component engaging the inwardly directed annular shoulder of the first telescoping component to limit the relative movement of the first and the second telescoping components, the tube-like extension of the third telescoping component slidably receiving the fourth telescoping component to encase the intermediate force spring, said engagements restricting the extended position of the casing.

21. A variable force spring assembly for supplying increasing resistance when subjected to an external axial force comprising, in combination:
- a casing having an outer telescoping component and an inner telescoping component slidably coupled to move between an extended position and a compressed position when subjected to the axial force, the outer and inner telescoping components being cup shaped with substantially adjacent open ends and oppositely disposed closed ends to define at least one internal cavity, the outer telescoping component including an inwardly directed shoulder,
- means for restricting the extended position of the casing,
- a low force spring disposed within the internal cavity and having a relatively low spring rate such that the low force spring compresses relatively large distances when subjected to a relatively low axial force,
- a high force spring having a relatively high spring rate such that the high force spring compresses relatively small distances when subjected to a relatively high axial force, the high force spring being disposed in a preloaded condition parallel to the low force spring within the internal cavity between the closed end of the cup shaped outer telescoping component and the inwardly directed shoulder, the open end of the cup shaped inner telescoping component contacting the high force spring to compress the high force spring after the low force spring has been compressed.

* * * * *